United States Patent [19]

Taniguchi

[11] Patent Number: 4,824,212

[45] Date of Patent: Apr. 25, 1989

[54] LIQUID CRYSTAL DISPLAY DEVICE HAVING SEPARATE DRIVING CIRCUITS FOR DISPLAY AND NON-DISPLAY REGIONS

[75] Inventor: Kouki Taniguchi, Osaka, Japan

[73] Assignee: Sharp Kabushiki Kaisha, Osaka, Japan

[21] Appl. No.: 167,889

[22] Filed: Mar. 14, 1988

[30] Foreign Application Priority Data

Mar. 14, 1987 [JP] Japan ................................ 62-59183

[51] Int. Cl.$^4$ .............................................. G02F 1/13
[52] U.S. Cl. ..................................... 350/333; 350/332; 350/336; 340/765; 340/784; 340/805
[58] Field of Search ....................... 350/332, 333, 336; 340/765, 784, 805

[56] References Cited

U.S. PATENT DOCUMENTS

| | | | |
|---|---|---|---|
| 4,224,617 | 9/1980 | Stein | 350/332 X |
| 4,443,062 | 4/1984 | Togashi et al. | 350/332 X |
| 4,656,470 | 4/1987 | Saka | 350/332 X |
| 4,662,718 | 5/1987 | Masubuchi | 350/332 |
| 4,748,444 | 5/1988 | Arai | 350/333 X |
| 4,759,609 | 7/1988 | Clerc | 350/333 |
| 4,764,766 | 8/1988 | Aoyama et al. | 350/333 X |

Primary Examiner—Stanley D. Miller
Assistant Examiner—Richard Gallivan
Attorney, Agent, or Firm—Birch, Stewart, Kolasch & Birch

[57] ABSTRACT

A liquid crystal display device comprising a display screen and liquid crystal element-driving circuits. The display screen has an effective display region with a plurality of transparent electrodes on both sides of liquid crystal elements to make characters visible and a non-display region that is the region other than the effective display region. The driving circuits are divided into two groups. One group is for driving the liquid crystal elements in the effective display region to display desired characters, and the other group is for driving the liquid crystal elements in the non-display region to make the non-display region dark or bright.

5 Claims, 3 Drawing Sheets

LIQUID CRYSTAL DISPLAY DEVICE HAVING SEPARATE DRIVING CIRCUITS FOR DISPLAY AND NON-DISPLAY REGIONS

BACKGROUND OF THE INVENTION

The present invention relates to a liquid crystal display device.

The conventional liquid crystal display device has a display screen comprising liquid crystal elements arranged on a plane and a pair of front and back substrates sandwiching the liquid crystal elements. Each of the front and back substrates are placed an orientational film having a rubbing layer of a predetermined direction, a transparent insulating substrate with a plurality of transparent electrodes arranged in lines on it, and a polarizing plate with a polarized light absorbing axis oriented in the predetermined direction, in this order. The front and back substrates face each other with the liquid crystal elements between them so that the orientational films are kept in contact with the front and back sides, respectively, of the liquid crystal elements. Generally, the lines of the transparent electrodes on the front substrate intersect the lines of the transparent electrodes on the back substrate, forming a lattice. Consequently, the display screen comprises an effective display region containing picture elements in the same quantity as the number of intersections M×N (M, N=the number of transparent electrode lines) between the transparent electrode lines, and a region other than the effective display region, called a non-display region where transparent electrodes exist on either the front or the back substrate but not on both substrates. Normally, the effective display region is framed by the non-display region on the display screen.

The orientational films and the polarizing plates are placed on both sides of the liquid crystal elements in such a manner that the rubbing layer on one side of the substrater forms a predetermined angle with the rubbing layer on the other side and that the polarized light absorbing axis of the polarizing plate on one side of the substrates is formed a predetermined angle with the direction of the polarized light absorbing axis of the polarizing plate on the other side. These angles determine the type of the display screen, that is the type of the screen can be either a black type (or normally dark type) in which the screen transmits light when voltage is applied between the electrodes and shuts off light when voltage is not applied, or a white type (or normally bright type) in which the screen transmits light when voltage is not applied between the electrodes and shuts off light when voltage is applied. Either type of the screens can be employed in conventional liquid crystal display devices.

In the display screen of the above liquid crystal display device, electrodes exist only on one side or the other of the liquid crystal elements in the non-display region, so that a driving voltage is not applied to the electrodes in the non-display region. Accordingly, when the display device is in the active state, the non-display region is either black or white depending upon the screen type. Specifically, on a normally black type screen, the non-display region is distinguished as a black frame, whereas on a normally white type screen, the non-display region is not distinguishable from the effective display region.

Therefore, when characters are displayed on the normally black type screen, a part of the characters may combine with the black non-display region, resulting in an illegible display of characters. When characters are to be displayed on the normally white type screen, on the other hand, it is difficult for the operator to plan the layout because the effective display region cannot be readily distinguished from the non-display region; the operator is obliged to input characters without clear knowledge of the boundary of the effective region. Against this background, a liquid crystal display device whose non-display region can be made dark or bright as desired depending upon the state on the effective display region has been desired but not yet realized.

SUMMARY OF THE INVENTION

In view of the above conventional problems, an objective of the present invention is to provide a liquid crystal display device having a display screen comprising an effective display region for showing characters and a region which surrounds the effective display region which is capable of changing the display state depending upon the display state on the effective display region.

Another objective of the present invention is to provide a liquid crystal display device whose display screen is divided into an effective display region for showing characters and a non-display region where no characters are displayed, the effective display region being defined by the non-display region.

Further objective of the present invention is to provide a liquid crystal display device capable of selecting the displaying of a non-display region with either black or white.

Other objectives and further scope of applicability of the present invention will become apparent from the detailed description given below. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objectives, according to an embodiment of the present invention, a liquid crystal display device contains a display screen comprising an effective display region in which a plurality of transparent electrodes are arranged in lines on both sides of liquid crystal elements so as to display characters and a region other than the effective display region (a non-display region) where characters are not displayed; and liquid crystal driving means comprising circuits for driving the liquid crystal elements arranged in the effective display region to display desired characters, and circuits for driving the liquid crystal elements arranged in the non-display region so as to make the non-display region either dark or bright as desired.

As described above, the liquid crystal display device of the present invention contains the display screen comprising the effective display region and the non-display region, and drives the liquid crystal elements in the non-display region independently of those in the effective display region, so that the non-display region can be made bright or dark as desired.

Since it is possible to select dark or bright state for the non-display region according to the display state in the effective display region, the effective display region is distinguishable from the non-display region.

BRIEF DESCRIPTION OF THE DRAWINGS

The present invention will become more fully understood from the detailed description given below and the accompanying drawings which are given by way of illustration only, and thus are not limitative of the present invention and wherein.

DETAILED DESCRIPTION OF THE PREFERRED EMBODIMENT

Figure 4:
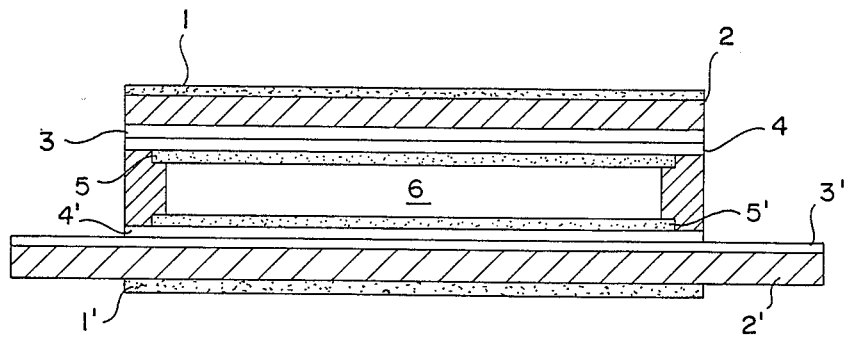
FIG. 4 is a construction drawing of the liquid crystal display device of the present invention.

FIG. 4 shows the construction of the liquid crystal display device of an embodiment of the present invention.

Referring to FIG. 4, a front transparent substrate 2 and a back transparent substrate 2' are mounted on either side of liquid crystal elements 6 via sealing members 7. An orientational film 5 or 5' having a rubbing layer of a predetermined direction, plural lines of transparent electrodes 4 or 4' and an insulating film 3 or 3' are provided on each of the front and back transparent substrates 2 and 2' on the side facing the liquid crystal elements 6. Polarizing plates 1 and 1' whose polarized light absorbing axis lines are oriented in a specified direction are provided on the opposite side of each of the front and back substrates 2 and 2' from the liquid crystal elements. The transparent electrodes 4 and 4' are arranged on the front and back substrates 2 and 2' so that they intersect each other to form a lattice with the liquid crystal elements 6 located between them. Therefore, an effective display region comprising picture elements of the same quantity as the number of intersections $M \times N$ (M, N=the number of transparent electrode lines) between the transparent electrodes 4 on the front substrate 2 and a region where the transparent electrodes 4' on the back substrate 2' and a display region containing either of the transparent electrodes 4 and 4' but not both, called a non-display region, where no characters are displayed, is formed in the display screen. On the display screen, the effective display region is surrounded by the non-display region.

In the following description of the liquid crystal display device of the present invention, it is assumed the number of transparent electrodes M on one side is 200, that the number of transparent electrodes N on the other side is 640, and that the number of picture elements in the effective display region is $200 \times 640 = 128,000$.

Figure 1:
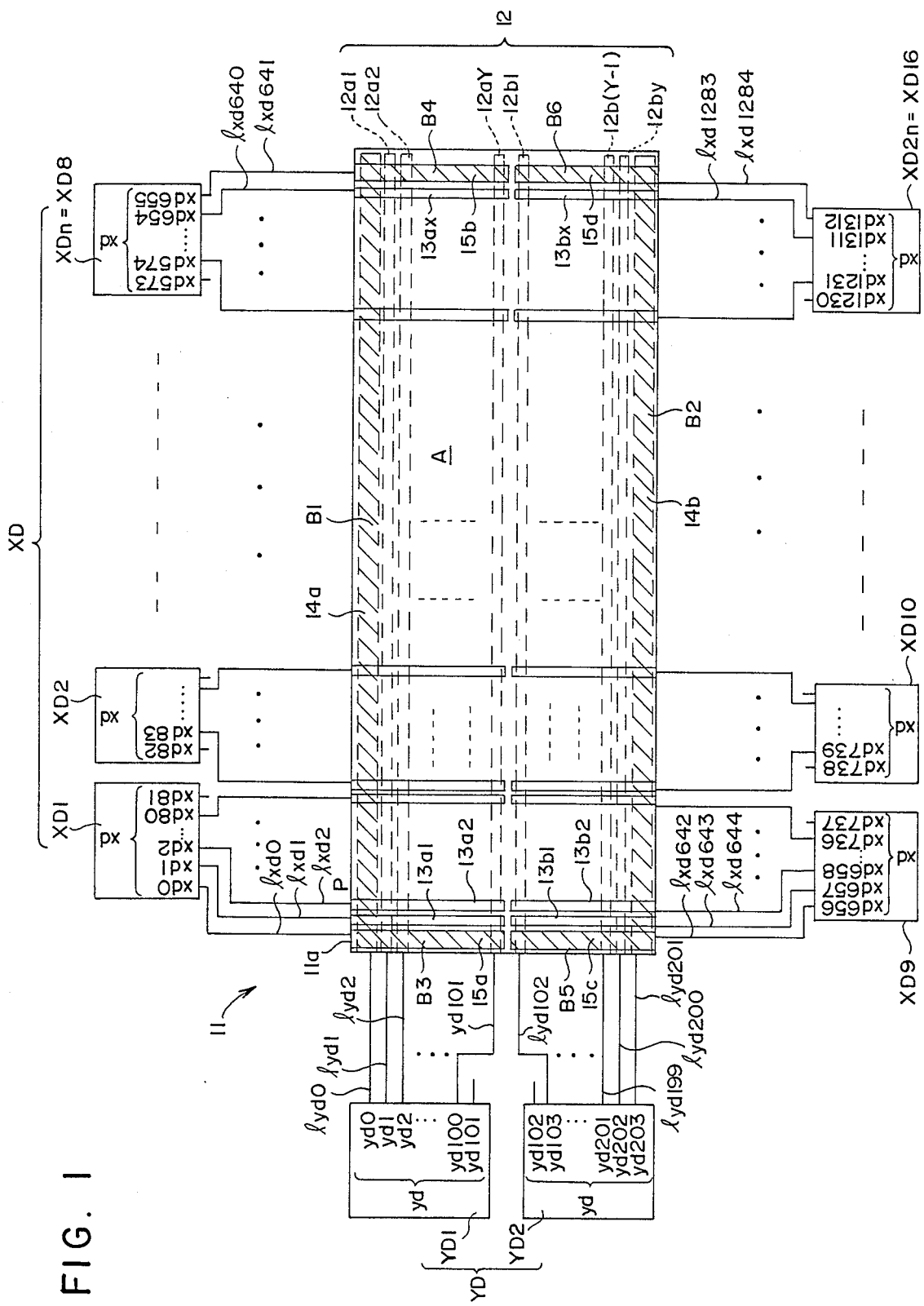
FIG. 1 is a block diagram showing the electrical construction of the liquid crystal display device of an embodiment of the present invention.

FIG. 1 is a block diagram showing the electrical construction of the liquid crystal display device 11 of the present invention. A display screen 11a comprises an effective display region A where characters and figures are visibly displayed and regions other than the effective display region or non-display regions B1, B2, . . . , B6 (The entire non-display regions below are referred to as B.) where no characters and figures are displayed. The effective display region A contains plural lines of horizontal transparent electrodes 12a1, 12a2, . . . , 12aY, 12b1, 12b2, . . . , 12bY (The entire horizontal transparent electrodes below are referred to as 12. In the present embodiment, Y=100 so that the total number of the horizontal electrodes is 200.) and plural lines of vertical transparent electrodes 13a1, 13a2, . . . , 13aX, 13b1, 13b2, . . . , 13bX (The entire vertical transparent electrodes below are referred to as 13. In the present embodiment, X=640 so that the total number of the vertical electrodes is 1,280.) divided into an upper and lower group and intersecting the horizontal transparent electrodes 12 to form a lattice. Accordingly, $(2X) \times (2Y)$ (or $2 \times 640 \times 2 \times 100 = 256,000$ in the present invention) intersections are formed between the horizontal transparent electrodes 12 and the vertical transparent electrodes 13, and picture elements "p" of the same number as the intersections are formed in the effective display region A.

The non-display region B surrounding the effective display region A comprises six non-display regions B1 through B6 realized by at least two horizontal transparent electrodes 14a and 14b (represented by 14) and at least four vertical transparent electrodes 15a, 15b, 15c and 15d (represented by 15) divided vertically into two groups. The horizontal transparent electrodes 14 intersect the vertical transparent electrodes 13 and 15. The vertical transparent electrodes 15 intersect the horizontal transparent electrodes 12 and 14. In the FIG. 1, the non-display region B is distinguished by oblique lines.

Driving voltages suitable to the display state of a desired character pattern on the display screen 11a are applied sequentially at a predetermined timing to the horizontal transparent electrodes 12 and 14 and to the vertical transparent electrodes 13 and 15 from driving means comprising a plurality of driving circuits which will be described later.

Driving circuits YD1 and YD2 (The two driving circuits below are referred to as YD.) supplying driving voltage to the plurality of the horizontal transparent electrodes 12 have 102 output terminals each. The total 204 output terminals are allotted with the serial reference numbers yd0 through yd101 and yd102 through yd203. (The entire output terminals below are referred to as yd. The output terminals yd101 and yd102 are not connected to the horizontal transparent electrodes 12.) The lines connected to the output terminals yd are allotted with the serial reference numbers lyd0 through lyd201 (represented by lyd).

The first output terminal yd0 and the last output terminal yd203 of the driving circuits YD are connected through the lines lyd0 and lyd201 to the horizontal transparent electrodes 14a and 14b of the non-display regions B1 and B2, respectively. All the other output terminals yd1 through yd202 (excluding the terminals yd1 and yd102) are connected via the lines lyd1 through lyd200 to the horizontal transparent electrodes 12 respectively.

Driving circuits XD1, XD2, . . . , XD2n (2n=16 in this embodiment. The entire driving circuits below are referred to as XD) supplying driving voltage to the plurality of the vertical transparent electrodes 13 have, say, 82 output terminals each. The total 1,312 output terminals are allotted with the serial reference numbers xd0 through xd1312. (The entire output terminals below are referred to as xd. The last output terminal xd81 of the driving circuit XD1, the first and the last output terminals xd82, xd163, xd164, xd245, xd246, xd327, . . . , xd1148 and xd1229 of the subsequent driving circuits XD2 through XD15 and the first output terminal xd1230 of the driving circuit XD16 are not connected to the vertical transparent electrodes 13.) The lines connected to the output terminals xd are allotted with the serial reference numbers lxd0 through lxd1283 (represented by lxd).

The first output terminal xd0 of the driving circuit XD1 and the last output terminal xd655 of the driving circuit XDn are connected through the lines lxd642 and lxd1283 to the vertical transparent electrodes 15c and 15d of the non-display regions B5 and B6, respectively. All the other output terminals xd1 through xd1310 (excluding the terminals xd82, xd163, xd164, xd245, xd246, xd327, ..., xd1148, xd1229 and xd1230) are connected via the lines lxd1 through lxd1282 to the vertical transparent electrodes 13, respectively.

In the display device 11 of the above construction, driving voltages are outputted through the output terminals yd and xd of the driving circuits YD and XD at predetermined timings in sequences corresponding to the desired display pattern so as to scan the display screen 11a, whereby each picture element p either transmits light or shuts off the light, that is, becomes bright or dark when driving voltage is being applied. Specifically, for a normally black (or normally dark) type display screen, the picture elements p transmit light when driving voltage is applied between the electrodes, and shut off the light when driving voltage is not applied, whereas for a normally white (or normally bright) type display screen the picture elements p transmit light when driving voltage is not applied and shut off the light when driving voltage is applied.

When the display screen 11a is irradiated from the back side by a light source (not shown) positioned to the rear and perpendicular to the paper showing FIG. 1, the desired characters or figures displayed on the screen 11a can be seen from the front side of the screen 11a. While the screen 11a is being scanned, if voltage outputs from the driving circuits XD1 through XD8 are shut off during the time sequence of the applying of the voltage to the horizontal electrode 14a of the non-display region B1, namely, during the period when voltage is supplied through the output terminal yd0 of the driving circuit YD1, no voltage is applied to the horizontal transparent electrode 14a. As a result, when the display screen 11a is of the normally black type, the non-display region B1 becomes dark and is distinguished as a black frame. When the display screen 11a is of the normally white type, on the other hand, the non-display region B1 becomes bright so that the black frame disappears. If outputs from the driving circuits XD1 through XD8 are connected to the vertical electrodes during the above mentioned period, voltage is applied to the horizontal transparent electrode 14a. Consequently, when the display screen 11a is of the normally black type, the non-display region B1 becomes bright so that the black frame disappears, and when the display screen 11a is of the normally white type, the non-display region B1 becomes dark, being distinguished as a black frame. All the other non-display regions B2 through B6 operate similarly as the non-display region B1.

As understood from the above, the liquid crystal display device of the present invention is characterized in that a plurality of horizontal transparent electrodes 14 and a plurality of vertical transparent electrodes 15 are provided even in the non-display region B of the display screen 11a, permitting voltage from the driving circuits YD and XD to be applied between the transparent electrodes 14 and 15 in the non-display region B at a predetermined timing independent of the voltage application to the transparent electrodes in the effective display region A.

Figure 2:
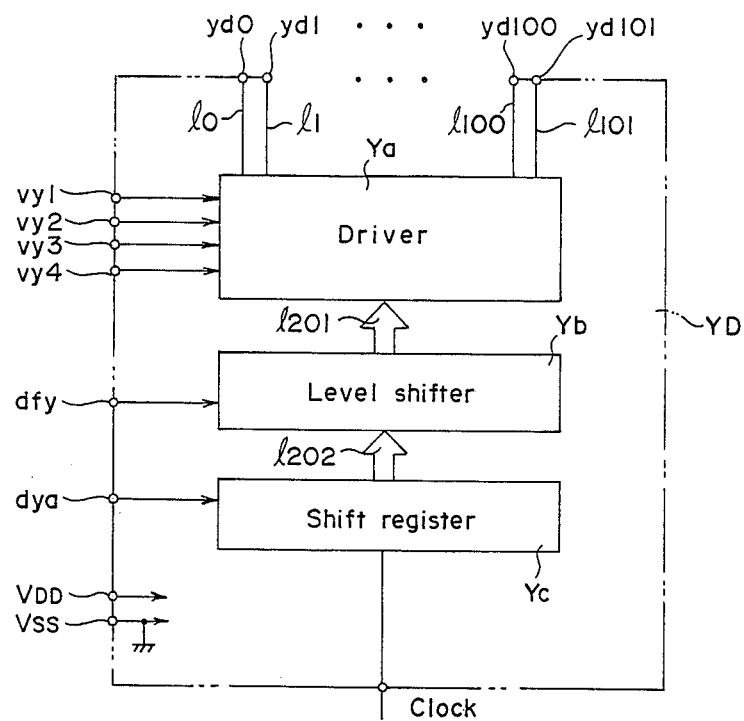
FIG. 2 is a block diagram of one of the circuits for driving the horizontal transparent electrode lines of an embodiment of the present invention.
Figure 3:
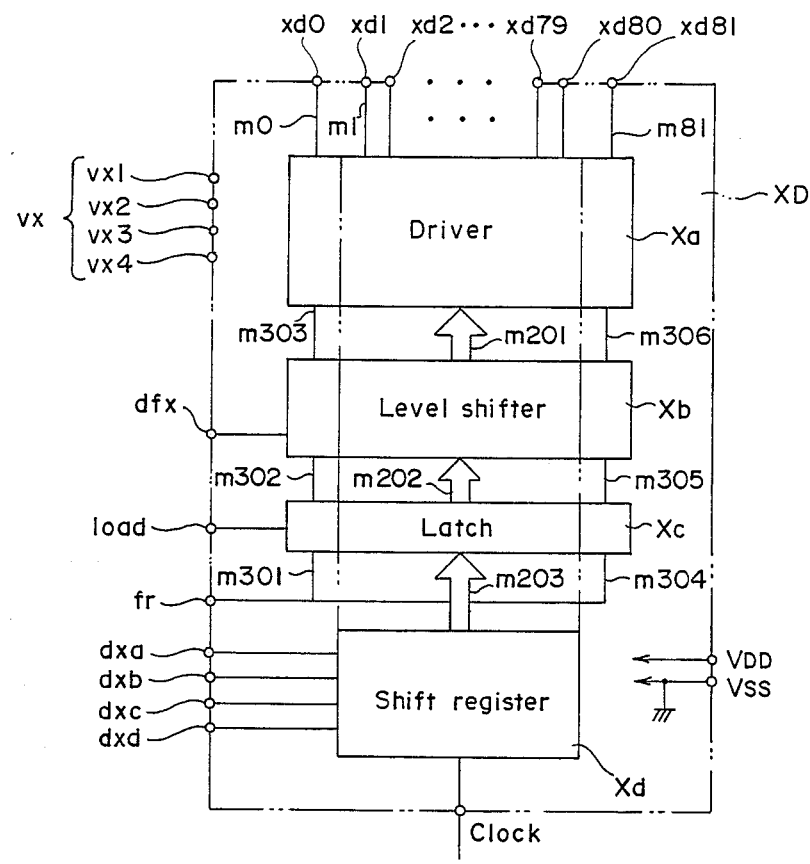
FIG. 3 is a block diagram of one of the circuits for driving the vertical transparent electrode lines of the embodiment of the present invention.

FIG. 2 is a block diagram showing the construction of one driving circuit YD which supplies driving voltage to the horizontal transparent electrodes of the display device of the present invention, and FIG. 3 is another block diagram showing the construction of one driving circuit XD for supplying driving voltage to the vertical transparent electrodes.

Referring to FIG. 2, the driving circuit YD is activated by application of supply voltage $V_{DD}$ and $V_{SS}$. The driving circuit YD is provided with, say, 102 output terminals yd0 through yd101 (represented by yd).

According to the present embodiment, the driving circuits YD comprises two driving circuits YD1 and YD2. The output terminal yd0 of the driving circuit YD1 and the output terminal yd203 of the driving circuit YD2 are connected to the horizontal transparent electrode 14a of the non-display region B1 and to the horizontal transparent electrode 14b of the non-display region B2, respectively. The output terminal yd101 of the driving circuit YD1 and the output terminal yd102 of the driving circuit YD2 are not connected to the horizontal electrodes. The output terminals yd1 through yd100 of the driving circuit YD1 are connected to the horizontal transparent electrodes 12a1 through 12aY, and the output terminals yd103 through yd202 of the driving circuit YD2 to the horizontal transparent electrodes 12b1 through 12bY. The operation of the driving circuits YD is described below focusing on the driving circuit YD1. The driving circuit YD2 operates similarly as the driving circuit YD1.

A driving voltage having of four levels in accordance with the density of characters to be displayed on the screen is supplied from a driver Ya via line 10 through 1101 to the output terminals yd (yd0 through yd101). The level of the driving voltage is determined by a level signal selected by the driver Ya from among four kinds of level signals supplied through level terminals vy1 through vy4 to the driver Ya while a level alternating signal supplied through a level selecting terminal dfy from a control circuit (not shown) is inputted to the driver Ya via a level shifter Yb and a line 1201.

Data signals are inputted through a data input terminal dya to a shift register Yc which outputs the data signals sequentially in shift through a line 1202, for scanning or selectively driving 101 horizontal transparent electrodes (including those for the non-display region) through the output terminals yd0 through yd100. During the scanning period, the driving voltage is either supplied or not to the last output terminal yd101 and the first output terminal yd0 for the non-display region, depending upon the display state of the screen. Supposing the driving voltage is being applied to the vertical transparent electrodes and that the display screen 11a is of the normally black type, the non-display region becomes bright when the driving voltage is supplied to the output terminals yd0 and yd101, and becomes dark when the driving voltage is not supplied. On the display screen 11a of the normally white type, the non-display region becomes dark when the driving voltage is supplied to the output terminals yd0 and yd101, and becomes bright when it is not supplied. When the driving voltage is not applied to the vertical transparent electrodes, the non-display region is dark on the normally black type screen and bright on the normally white type screen regardless of whether or not the driving voltage is supplied to the output terminals yd0 and yd101.

Referring to FIG. 3, each driving circuit XD is activated by application of supply voltages Vdd and Vss. Each driving circuit XD is provided with, say, 82 output terminals xd0 through xd81 (represented by xd).

According to the present embodiment, the driving circuits XD comprises the driving circuits XD1 through $XD_{2n=16}$. Of the 82 output terminals of each driving circuit XD, the output terminal xd0 of the driving circuit XD1, the output terminal xd655 of the driving circuit $XD_{n=8}$, the output terminal xd656 of the driving circuit ZD9, and the output terminal xd1312 of the driving circuit $XD_{2n=16}$ are connected to the vertical transparent electrodes 15a, 15b, 15c and 15d of the non-display regions B3, B4, B5 and B6, respectively. The last output terminal xd81 of the driving circuit XD1 and the last output terminal xd737 of the driving circuit XD9 are not connected to the vertical transparent electrodes. The first output terminal xd573 of the driving circuit $XD_{n=8}$ and the first output terminal xd1230 of the driving circuit $XD_{2n=16}$ are not connected to the vertical transparent electrodes. In short, the first and the last of the 82 output terminals of each of the driving circuits XD are either connected to the vertical transparent electrodes 15a through 15d of the non-display region B or not connected to any electrodes. All the remaining output terminals are connected to the vertical transparent electrodes in the effective display region one to one.

The operation of the driving circuits XD is described below focusing on the driving circuit XD1. The other driving circuits operate similarly as the driving circuit XD1.

The output terminals xd1 through xd80 of the driving circuit XD are individually connected to the vertical transparent electrodes 13 of the effective display region A. A driving voltage having four levels in accordance with the density of characters to be displayed on the screen is supplied to the output terminals xd (xd0 through xd81) from a driver Xa via lines m0 through m81. The level of the driving voltage is determined by a level signal selected by the driver Xa from among four kinds of level signals supplied to the driver Xa through level terminals vx1 through vx4 while a level alternating signal supplied through a level selecting terminal dfx from a control circuit (not shown) is input to the driver Xa via a level shifter Xb and a line m201.

Selected data signals are inputted through four data input terminals dxa, dxb, dxc and dxd to a shift register Xd which outputs the signals sequentially in shift to a latch circuit Xc via a line m203, for scanning or selectively driving 80 vertical transparent electrodes 13 (excluding the one for the non-display region) through the output terminals xd1 through xd80. Meanwhile, a non-display selecting data signal supplied via a non-display selecting terminal fr is inputted to the latch circuit Xc through lines m301 and m304 according to the display state on the screen. Supposing that the driving voltage is applied to the non-display region B1 or B2 (through the output terminal yd0 or yd203 in FIG. 2) by the horizontal transparent electrode-driving circuit YD, when a load signal is inputted to the latch circuit Xc via a load signal terminal load, the latch circuit Xc latches the non-display selecting data signal. Thus, the signal instructing the display of the non-display region B is transmitted through a line m202 to the level shifter Xb to the line m201 to the driver Xa, whereby the driving voltage is output to all of the output terminals xd1 through xd80 or not outputted to any of them, depending upon the display type (normally black or normally white) of the display screen 11a.

Meanwhile, the driving voltage is out utted through a line m302 or m305 to the level shifter Xb to a line m303 or m306 to the output terminal xd0 or xd81 connected to the vertical transparent electrode 15 of the non-display region. The driving voltage may be outputted or may not be outputted depending upon the display type (normally black or normally white) of the display screen 11a.

According to the present invention, as understood from the above description, the driving voltage output is connected to or disconnected from the electrodes in the non-display region independenlty of the voltage application to the effective display region for character display, whereby a black frame can be shown on the non-display region of the display screen as desired. As a result, the display performance of the liquid crystal display device is remarkably improved.

In the above embodiment, the display device provides monochromatic pictures. It is possible to provide color pictures when a color filter corresponding to the picture elements is placed on either of the two orientational films constituting the display screen. The number of picture elements in the effective display region of the display screen is $2 \times 640 \times 200 = 256,000$ in the present invention, although it is not limited to this number. Further, in the present embodiment, some of the output terminals of the driving circuits which form the driving means remain unconnected to transparent electrodes. The driving circuits may have such a construction that all the output terminals of the driving circuits are connected to the electrodes in the effective display region. The number of required driving circuits may be decreased depending upon the number of the picture elements.

As described in the above, the liquid crystal display device of the present invention contains both horizontal and vertical transparent electrodes even in the non-display region of the display screen, and display means for driving each transparent electrode arranged in the non-display region independently of the other electrodes in the effective display region, so that the non-display region can be made dark or bright as desired. Namely, it is possible to show or erase a black frame on the non-display region of the screen depending upon the display state on the screen. Consequently, the use and display performance of the liquid crystal display device are improved remarkably.

While only certain embodiments of the present invention have been described, it will be apparent to those skilled in the art that various changes and modifications may be made therein without departing from the spirit and scope of the present invention as claimed.

What Is Claimed Is:

1. A liquid crystal display device, comprising: a display section comprising an effective display region having a plurality of transparent electrodes arranged on both sides of liquid crystal elements so as to make characters visible and a non-display region other than said effective display region; and liquid crystal driving means comprising first driving circuits for driving the liquid crystal elements in said effective display region to display desired characters, and second driving circuits for driving the liquid crystal elements in said non-display region to make said non-display region dark or bright.

2. The liquid crystal display device of claim 1, wherein said display section is of either normally black type or normally white type selectable as desired.

3. The liquid crystal display device of claim 2, wherein when said display section is of said normally black type, said non-display region is driven to become bright by said second driving circuits of the liquid crystal driving means.

4. The liquid crystal display device of claim 2, wherein when said display section is of said normally white type, said non-display region is driven to become dark by said second driving circuits.

5. The liquid crystal display device of claim 1, wherein said non-display region defines said effective display region.

* * * * *